United States Patent [19]
Randall

[11] Patent Number: 5,209,911
[45] Date of Patent: May 11, 1993

[54] METHOD OF MAKING METAL STANNATES

[75] Inventor: David J. Randall, London, England

[73] Assignee: Alcan International Limited, Montreal, Canada

[21] Appl. No.: 778,192

[22] PCT Filed: Jul. 20, 1990

[86] PCT No.: PCT/GB90/01121
§ 371 Date: Feb. 27, 1992
§ 102(e) Date: Feb. 27, 1992

[87] PCT Pub. No.: WO91/01273
PCT Pub. Date: Feb. 7, 1991

[30] Foreign Application Priority Data

Jul. 21, 1989 [GB] United Kingdom ............... 8916653

[51] Int. Cl.$^5$ ............................................. C01G 19/00
[52] U.S. Cl. ................................... 423/92; 423/89; 423/99; 423/101; 423/87; 423/158; 423/618
[58] Field of Search ............... 423/89, 92, 98, 618, 423/99, 100, 155, 157, 158, 87, 101; 209/167

[56] References Cited

U.S. PATENT DOCUMENTS

| | | | |
|---|---|---|---|
| 974,463 | 11/1910 | Brandenburg | 423/92 |
| 1,529,260 | 3/1925 | Lubowsky | 423/92 |
| 1,811,142 | 6/1931 | Little | 423/92 |
| 4,065,544 | 12/1977 | Hamling et al. | 423/252 |
| 4,229,287 | 10/1980 | Lepetic | 209/167 |

FOREIGN PATENT DOCUMENTS

| | | |
|---|---|---|
| 1214045 | 11/1986 | Canada . |
| 60-221319 | 11/1985 | Japan . |
| WO89/09962 | 2/1989 | PCT Int'l Appl. . |

OTHER PUBLICATIONS

Chemical Abstracts vol. 107, 1987 201495s.
Chemical Abstracts, vol. 99, No. 7 99:62791m, p. 570.
Chemical Abstracts, vol. 116, No. 19 116:195630z.

*Primary Examiner*—Theodore Morris
*Assistant Examiner*—Edward Squillante
*Attorney, Agent, or Firm*—Cooper & Dunham

[57] ABSTRACT

The present invention describes a method of making metal stannates by reacting a solid metal oxide, hydroxide or carbonate with an aqueous stannate solution and recovering the precipitated metal stannate, the solid component being added in an amount which is stoichiometrically not substantially more then the amount of tin.

8 Claims, No Drawings

METHOD OF MAKING METAL STANNATES

Divalent metal stannates are being increasingly used as fire retardant additives in polymer formulations. They generally exist in an two forms of formula $MSn(OH)_6$, and $MSnO_3$, the latter being readily formed by heating the former to drive off water, and also in a third form of formula $M_2SnO_4$. The standard way of making these divalent metal stannates is by mixing an aqueous solution of sodium or another stannate with an aqueous solution of a salt of the divalent metal in question, and recovering the precipitated divalent metal stannate. This process suffers from disadvantages. The precipitate tends to be colloidal and difficult to filter, and is contaminated with chloride or other anions. The byproduct is sodium chloride or other sodium salt of low value.

German Patent No. 348670 describes a process for the separation of tin from an alkaline solution by reacting the soiution with an excess of an insoluble magnesium salt such as magnesium phosphate or carbonate.

Canadian Patent No. 1,214,045 describes a process for the recovery of indium and tin in which tin containing solids are fused with solid sodium or potassium hydroxide to produce a soluble stannate which is then leached out with water. The leached solution is then reacted with an excess of calcium hydroxide to give a precipitate from which tin is recovered.

In contrast to these prior methods, which are designed to recover tin in an unspecified state, the present invention has the object of making a metal stannate or hydroxystannate by an improved route.

The present invention provides a method of making a substantially pure metal stannate, which method comprises mixing a solid metal oxide, hydroxide or carbonate with an aqueous stannate solution and recovering a precipitated metal stannate, the solid metal oxide, hydroxide or carbonate being added in an amount which is stoichiometrically not more than the amount of tin.

The metal stannate generally has the formula $M_aSnO_3$ or $M_aSn(OH)_6$ where M is the metal and a is 2/(metal valency); or $M_bSnO_4$ where b is 4/(metal valency). Metal valency may be 1, 2, 3, 4 or higher. The nature of the metal is not very critical. Preferred divalent metals, on account of the economic importance of their stannates are Zn, Mg, Ca, Ba and Bi; most preferred are Zn and Bi. These metals are used in the form of their oxide, hydroxide or carbonate, preferably the oxide or hydroxide, which terms are used to include mixed forms such as hydrated oxide or basic carbonate. The oxide, hydroxide or carbonate is generally insoluble or substantially insoluble in water, is used in solid form, and contains substantially no non-fugitive anion which might otherwise contaminate the product. To speed reaction, this solid reagent is preferably used in comminuted form.

The stannate solution is generally an aqueous solution of sodium or potassium stannate. This is mixed with the solid reagent, in proportions which are not very critical, provided that the solid reagent is added in an amount which is stoichiometrically not more than the amount of tin. If the solid reagent is added in an excess then the metal stannate produced will be contaminated with unreacted metal oxide, hydroxide or carbonate. In order to obtain the metal stannate in substantially pure form it is preferred that the solid reagent is stoichiometrically no more than the amount of tin in the solution. Provided quantitative reaction is obtained it is possible to remove essentially all the stannate ions from solution. If the caustic soda/sodium stannate liquor is to be recycled, there is little disadvantage in use of a slight excess of stannate, a method which is preferred as it ensures complete conversion of divalent species to the hydroxystannate. Indeed a large excess of sodium stannate may help to convert less reactive oxides, hydroxides or carbonates such as magnesium. The excess stannate remains in solution and does not contaminate the product. The mixture is stirred at ambient or elevated temperature until the reaction has gone sufficiently far, which may typically take from 5 minutes to 10 hours. Heating the mixture to boiling point is possible but not particularly advantageous. During this process, the metal stannate, which is generally more insoluble than the metal oxide, hydroxide or carbonate, is formed and precipitates out of solution.

If the reaction is allowed to go to completion, the metal stannate is obtained in substantially pure form as an easily recoverable precipitate. If the reaction does not go to completion, the metal stannate may be contaminated with metal oxide, hydroxide or carbonate. This contaminated product may be acceptable for many purposes.

The pH of the mixture is not very critical, and may preferably be the natural alkaline pH of the aqueous stannate solution. After reaction, the mixture is filtered and the precipitate washed with cold water to recover excess caustic alkali.

Reference is also made to our co-pending PCT Application entitled "Method of Making Alkali Metal Stannates" filed on the same date as the present application which describes a method of making alkali metal stannates. This is the preferred method of obtaining the alkali metal stannate since that process can be combined with the process of the present invention to give a process for the production of alkali metal stannates from cassiterite in a two stage reaction without the need to produce tin metal and use a three stage reaction which is current commercial practice.

The overall process is as follows:

Cassiterite, preferably ground, is heated under pressure with a solution of alkali, such as potassium or sodium hydroxide, preferably at at least 200° C. After cooling the resultant siurry is filtered to remove the unreacted ore and precipitate which are then washed with water to dissolve the alkali metal stannate. The alkali metal stannate containing liquor is then reacted with a metal oxide, hydroxide or carbonate as previousiy described and filtered to remove the metal stannate. The filtrate is then preferably recycled to the cassiterite reaction stage together with the alkali metal hydroxide containing filtrate from the first stage.

The advantages of the method of this invention over the conventional one may be summarised:

a) Reduced cost. The metal oxide, hydroxide or carbonate does not need to be reacted with acid.

b) A by-product of the reaction is a hydroxide e.g. sodium hydroxide, which is more valuable than a salt e.g. sodium chloride, and can simply be recycled and re-used.

c) There is no contamination by anion, e.g. chloride of the product.

d) The product is crystalline and has good characteristics for filtration.

e) Unlike the case where a metal salt solution is used, it is by no means necessary to use stoichiometric amounts of the two reactants.

The following examples illustrate the invention.

EXAMPLE 1

1.5 kg sodium stannate solution (a commercial product containing 14.2% by weight of tin) was heated with stirring with 180 g basic zinc carbonate $ZnCO_3.ZnO.3H_2O$ containing 68% by weight of ZnO.

After 1 hour the slurry had reached 80° C. A sample was filtered and the precipitate washed with deionised water, dried at 80° C. and examined by X-ray diffraction. The X-ray diffraction spectrum showed the product to be pure $ZnSn(OH)_6$ with the following diffraction angles:

| Peak | 2theta | d | rel. intensity |
|------|--------|--------|----------------|
| 1 | 19.77 | 4.4784 | 16.4 |
| 2 | 22.89 | 3.8827 | 100 |
| 3 | 32.60 | 2.7446 | 46.2 |
| 4 | 36.53 | 2.4580 | 5.4 |
| 5 | 38.43 | 2.3407 | 6.6 |
| 6 | 40.21 | 2.2410 | 14.8 |
| 7 | 43.56 | 2.0760 | 2.5 |
| 8 | 46.77 | 1.9408 | 11.9 |

These results correspond to the pattern for zinc tin hydroxide $ZnSn(OH)_6$, number 20-1455 in the Hanawallt X-ray diffraction pattern manual. There were no extra lines of contaminating phases.

EXAMPLE 2

1.5 kg of the sodium stannate solution was reacted as above with 85 g of commercial $Mg(OH)_2$. After 1 hour, a sample showed the existence of some $MgSn(OH)_6$ in the precipitate. Heating was continued for a total of 4 hours, at the end of which it was estimated that half the starting $Mg(OH)_2$ had been converted to stannate. A higher yield is likely using $MgCO_3.6H_2O$.

EXAMPLES 3 to 5

The following Table gives the results of further experiments carried out using different metal oxides and hydroxides.

| EXAMPLE | REAGENT | PRODUCTS |
|---------|---------|----------|
| 3 | $Ba(OH)_2$ | $BaSn(OH)_6$ Clean X-Ray Identification |
| 4 | ZnO | $ZnSn(OH)_6$ Clean X-Ray Identification |
| 5 | $Ca(OH)_2$ | $CaSn(OH)_6$ Slight indication of $Ca(OH)_2$ |

EXAMPLE 6

50 grams of Zinc Oxide (Zinc Oxide 200 from Durham Chemicals) was added to a solution containing 180 grams of Sodium Stannate $Na_2Sn(OH)_6$ in 1 liter of water. The solution was heated to 80° C. and stirred for 6 hours. After stirring the slurry was filtered and washed twice with de-ionised water. The filter cake was removed from the filter paper and dried at 110° C. for 18 hours. 170 grams of dry solid was produced. The resulting product was examined by Powder X-ray Diffraction. The X-ray diffraction pattern was found to match closely with that for Zinc Tin Hydroxide $ZnSn(OH)_6$ pattern number 20-1455 in the JCPDS Powder Diffraction file.

| X-ray Characteristics of Product | |
|------|------|
| d Spacing | Relative Intensity |
| 4.46 | 12 |
| 3.88 | 100 |
| 2.74 | 47 |
| 2.45 | 5 |
| 2.33 | 6 |
| 2.23 | 16 |
| 2.07 | 2 |
| 1.94 | 14 |
| 1.77 | 3 |
| 1.73 | 29 |
| 1.57 | 19 |
| 1.49 | 2 |
| Elemental analyses of this product are: | |
| Tin Concentration | 39.8% |
| Zinc Concentration | 22.6% |

EXAMPLE 7

In the first stage 150 grams of Indonesian Cassiterite containing approximately 95% Tin Oxide were ball milled in 250 grams of water for 24 hours.

This slurry was then added to an autoclave containing 480 grams of Sodium Hydroxide dissolved in 450 grams of water. The reactants were stirred in a sealed autoclave at 275° C. for 5 hours. After allowing it to cool the resultant mixed slurry containing unreacted ore and precipitate was filtered. The filter cake which contained the desired product was then washed with 1 liter of hot water in which it dissolved. 20 grams of insoluble material remained indicating that 86% of the Cassiterite had reacted to produce Sodium Stannate.

In the second stage all of the liquor produced was heated to 80° C. 40 grams of Zinc Oxide powder were added. This slurry was then stirred for 6 hours then filtered and washed with de-ionised water.

This filtrate could now be recycled back to the autoclave together with the filtrate containing Sodium Hydroxide from the first stage ready for further extraction.

The filter cake from this second stage was then dried at 110° C. for 18 hours in an oven. 135 grams of solid were collected.

This product was examined by Powder X-ray Diffraction and was found to be pure Zinc Hydroxy Stannate as described above in Example 6.

I claim:

1. A method of making an at least 95% pure metal stannate, which method comprises mixing a solid metal oxide, hydroxide or carbonate with an aqueous stannate solution and recovering an at least 95% pure precipitated metal stannate, the solid metal oxide, hydroxide or carbonate being added in an amount which is stoichiometrically not more than the amount of tin.

2. A method as claimed in claim 11, wherein the metal of the solid metal oxide, hydroxide or carbonate is divalent.

3. A method as claimed in claim 2, wherein the divalent metal is zinc.

4. A method as claimed in claim 2, wherein the divalent metal is selected from Zn, Mg, Ca, Ba and Bi.

5. A method as claimed in claim 1, wherein the aqueous stannate solution is of sodium or potassium stannate.

6. A method as claimed in claim 1, wherein the solid metal oxide, hydroxide or carbonate is a metal oxide or hydroxide.

7. A method as claimed in claim 1, wherein the aqueous stannate solution is used in stoichiometric excess.

8. A method of making a metal stannate which method comprises heating at a temperature of at least 200° C. cassiterite under a pressure greater than atmospheric pressure, in a solution of alkali, to produce an alkali metal stannate in said solution of alkali and reacting the alkali metal stannate in solution with a solid metal oxide, hydroxide or carbonate in an amount which is stoichiometrically not more than the amount of tin in order to obtain the metal stannate.

* * * * *